Sept. 6, 1955      M. F. HALL      2,717,148
AIR CLEANER AND HUMIDIFIER
Filed Nov. 19, 1953      3 Sheets-Sheet 1
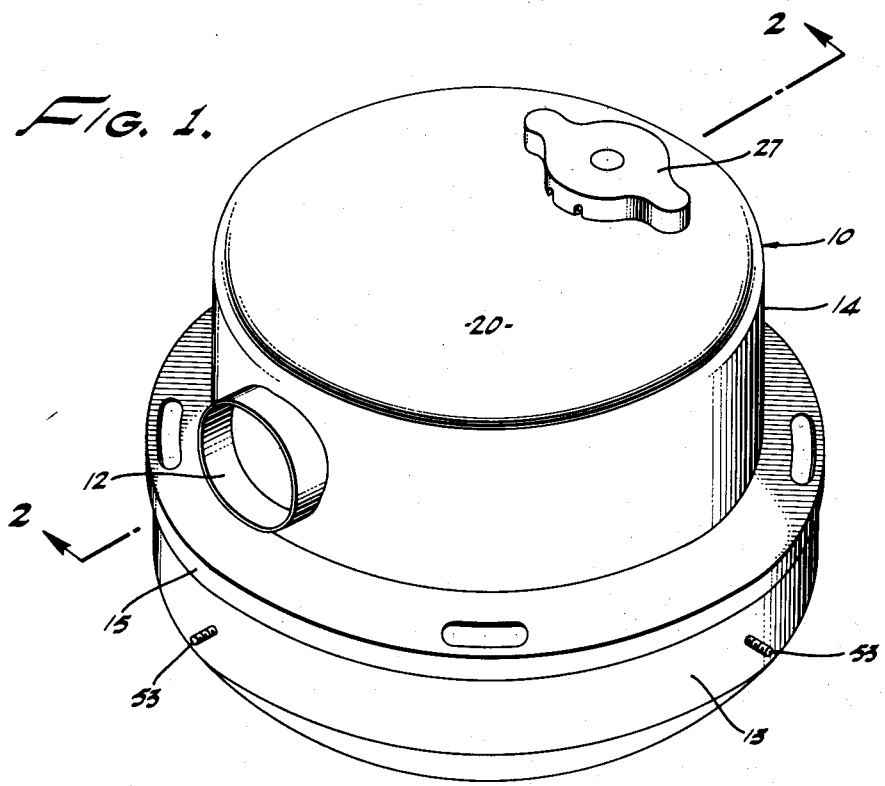
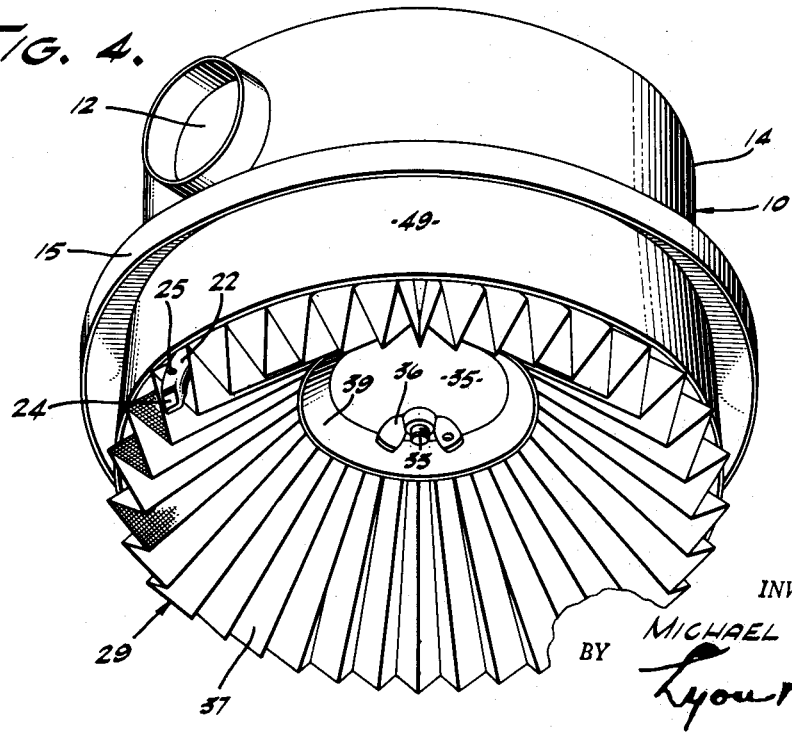
INVENTOR.
MICHAEL F. HALL
BY
Lyon & Lyon
ATTORNEYS Sept. 6, 1955 M. F. HALL 2,717,148
AIR CLEANER AND HUMIDIFIER
Filed Nov. 19, 1953 3 Sheets-Sheet 2

INVENTOR.
MICHAEL F. HALL
BY
Lyon & Lyon
ATTORNEYS

Sept. 6, 1955 M. F. HALL 2,717,148
AIR CLEANER AND HUMIDIFIER
Filed Nov. 19, 1953 3 Sheets-Sheet 3
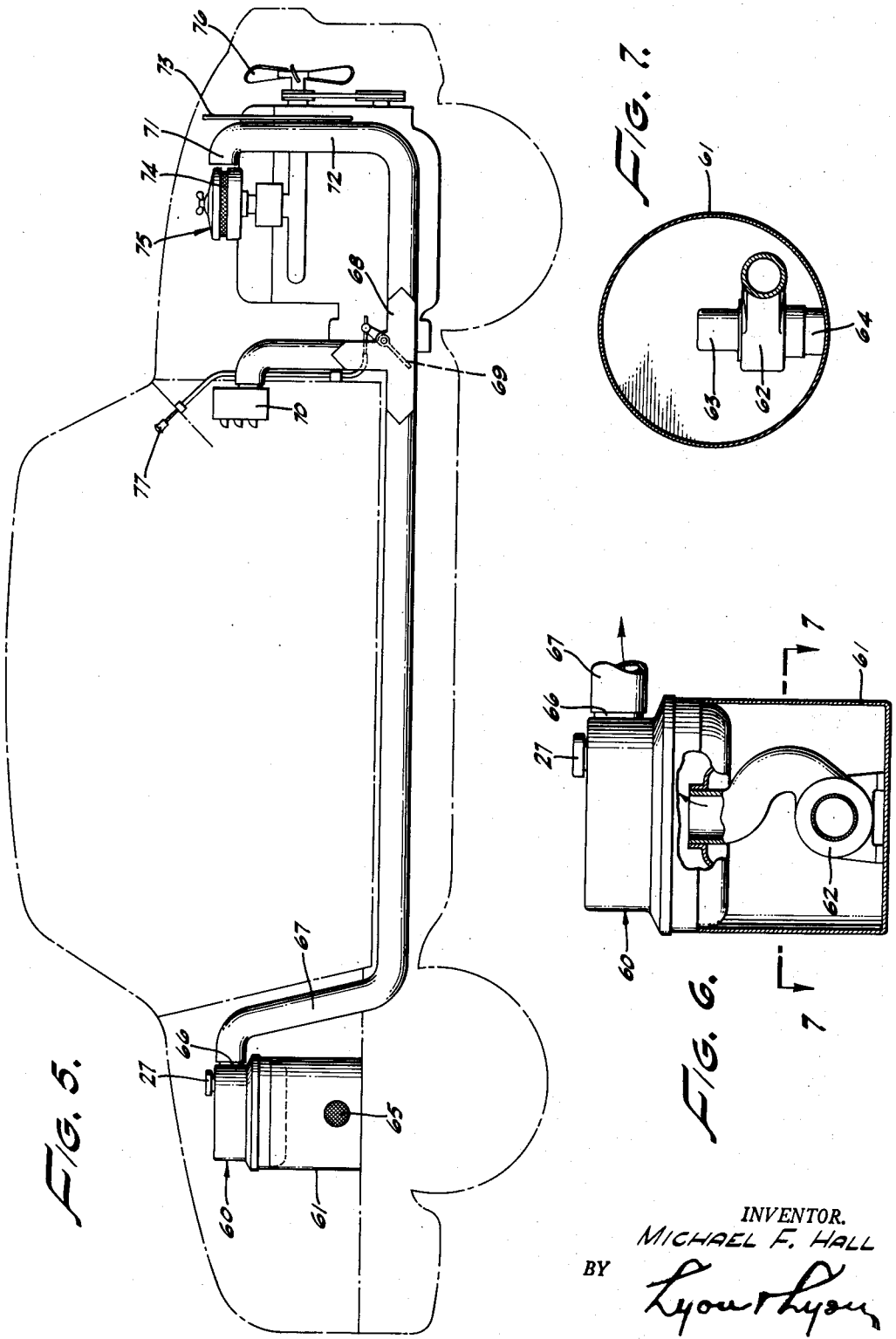
INVENTOR.
MICHAEL F. HALL
BY
Lyon & Lyon
ATTORNEYS

UNITED STATES PATENT OFFICE 2,717,148
Patented Sept. 6, 1955

2,717,148

AIR CLEANER AND HUMIDIFIER

Michael Frank Hall, Huntington Park, Calif.

Application November 19, 1953, Serial No. 393,190

2 Claims. (Cl. 261—16)

This invention relates particularly to an air cleaner, cooler and humidifier and is particularly directed to improvements which contribute to higher efficiency and lower cost. An object of this invention is to provide an air cleaner and humidifier for delivering air to the intake of an internal combustion engine, which device is unusually compact and which occupies a minimum of space although it is entirely self-contained and has the water reservoir located within it. Another object is to provide such a device which may be used to cool the passenger or driver's compartment in an automobile, truck, house trailer or other vehicle.

Another object is to provide a device of this type having a novel form of filter element employing hydroscopic material.

Another object is to provide such a device in which the filter element has a portion thereof resting within an annular water chamber and serving to maintain the entire surface of the filter element in a wet condition by capillary action.

Another object is to provide a device of this type having novel means regulating the water level in the chamber and for replenishing water from the storage reservoir as required.

Another object is to provide a device of this type which may be readily mounted adjacent the carburetor intake on a wide variety of types of motor cars and trucks.

Another object is to provide a cooling and humidifying device which may be used either for cooling the interior of an automobile or other vehicle or for supplying humidified air into the intake of the internal combustion engine on such vehicle.

Other and more detailed objects and advantages will appear hereinafter.

In the drawings:

Figure 1 is a perspective view showing a preferred embodiment of my invention.

Figure 4 is a perspective view with the bottom pan removed.

Figure 5 is a side elevation in diagrammatic form showing the use of my humidifier device for supplying air into the intake of the internal combustion engine or for cooling the interior of an automobile or other vehicle.

Figure 6 is a side elevation partly broken away showing how a fan or blower may be used to cause a flow of air through the humidifying device.

Figure 7 is a sectional detail taken substantially on the lines 7—7 as shown in Figure 6.

Figure 2:
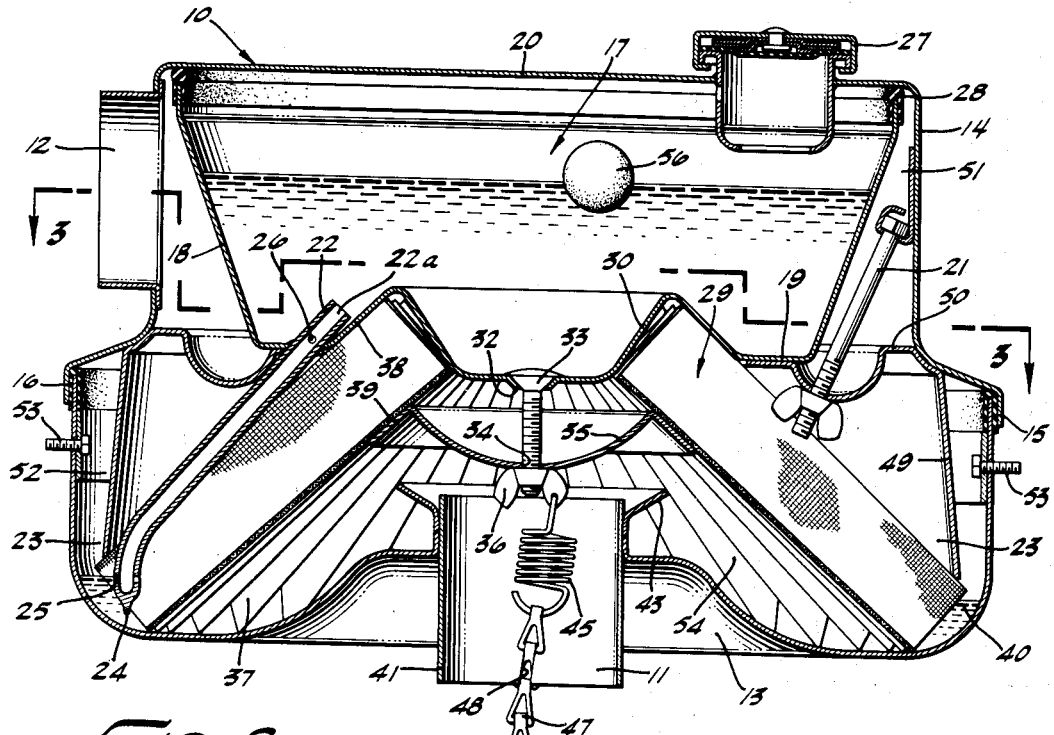
Figure 2 is a sectional elevation taken substantially on the lines 2—2 as shown in Figure 1.
Figure 3:
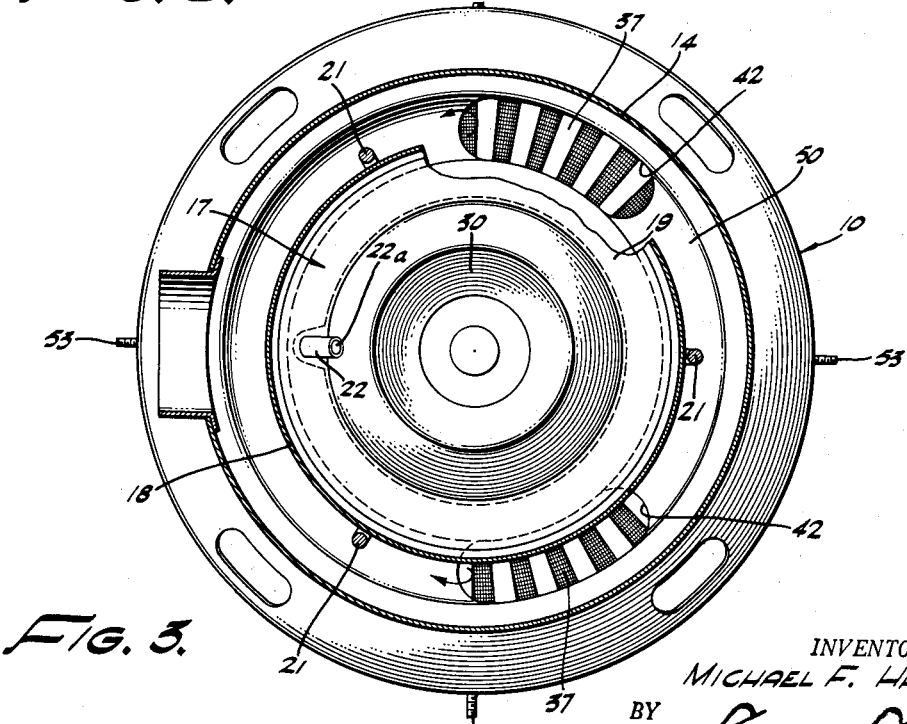
Figure 3 is a sectional plane view taken substantially on the lines 3—3 as shown in Figure 2.

Referring to the drawings:

The air cleaner and humidifier generally designated 10 is provided with an air inlet 11 and an outlet 12. The inlet is provided in the bottom pan 13, and the outlet is positioned on the cover or housing 14. The cover 14 is provided with a circular depending flange 15 which receives the upper end of the wall of the circular pan 13. A gasket 16 prevents leakage between the cover 14 and the pan 13.

Mounted in the cover 14 is a water storage reservoir 17 defined between walls 18, 19 and 20. The wall 20 constitutes a part of the cover 14. The walls 18 and 19 may be formed integrally and secured to the cover 14 by means of the support bolts 21. A metering tube 22 is fixed to the wall 19 and has an open upper end 22a extending into the storage reservoir 17. The lower end of the tube 22 projects down into the cavity 23 within the pan 13. The extreme lower end 24 of the tube is closed. A lateral port 25 of relatively small diameter is provided in the tube 22 near the lower end thereof. Another small lateral port 26 is provided in the tube at a location to communicate with the interior of the storage reservoir near the bottom wall 19. Water in the storage reservoir 17 enters the tube 22 through the open upper end 22a or through the lateral port 26. The water emerges from the tube through the lateral port 25. The ports 25 and 26 are very small in diameter; for example, they may be formed with a No. 50 drill.

Water flows into the pan 13 from the reservoir 17 until water level in the pan reaches the level of the outlet port 25. The water level in the pan 13 does not rise materially higher than the location of the port 25 because of the partial vacuum set up within the reservoir 17. The filling cap 27 makes a tight fit with the cover 14, and likewise the gasket 28 forms a tight fit between the wall 18 and the wall 20. Entrance of air into the reservoir via the filling cap 27 or between the parts 18 and 20 is thus prevented.

A humidifier and filter assembly generally designated 29 is positioned within the chamber 23 and is supported from its upper end on the wall 19. An annular ring 30 is formed on the bottom wall 19 and is provided with a central opening 32. A threaded element 33 is received within the opening 32 and extends through a central bore 34 on the clamping ring 35. The wing nut 36 on the element 33 serves to hold the clamping ring 35 against displacement.

The filter element 37 is clamped between the skirts 38 and 39 of the rings 30 and 35. This filter element 37 is formed of flocked wire mesh screen. The shape of the filter element 37 is generally conical, the side walls being corrugated with alternating ribs and valleys as shown clearly in Figure 4. The maximum of surface area is thus provided. The lower end of the conical element 37 projects into the pool of water 40 in the lower portion of the chamber 23. The entire surface of the element 37 is saturated with the water by capillary action and by splash action resulting from movement of the vehicle.

The air inlet 11 comprises a vertical pipe 41 mounted centrally within the bottom of the pan 13. A circular baffle 43 is located near the upper end of the pipe 41 and projects radially outwardly into the chamber 23. The purpose of the baffle 43 is to prevent water from sloshing out of the pool 40 and escaping through the air inlet 11.

Means are provided for detachably connecting the pan 13 to the cover 14. As shown in the drawings, this means includes a coil spring 45 connected at one end to the wing nut 36 and connected at the other end to the inlet pipe 41 by means of the chain 47. A link of the chain is adapted to pass through a slot 48 at the lower end of the pipe 41 to maintain an upward force which acts to hold the pan 13 against disassembly from the cover 14.

A downwardly extending annular skirt 49 is provided within the cover 14 and projects into the chamber 23. This skirt serves as a flow directing element for causing supplementary air from the auxiliary inlet ports 42 in the cover 14 to change direction abruptly as it reaches the lower edge of the skirt 49, and thereby drop impurities into the pool 40. The supplementary air does not pass through the mesh of the filter element 37, but nevertheless is humidified to some extent in passing in close proximity to the surfaces of the filter element. Supplementary air is required when the engine operates on full throttle. The skirt 49 also provides an annular surge chamber 54 to receive water from the pool 40 and thus minimize splashing of water droplets into the critical intake area of chamber 23 with consequent danger of being carried into the engine.

An annular barrier plate 50 is mounted on the wall 19. This barrier plate 50 is provided with spaced apertures 42 which establish communication between the chamber 23 and the annular space 51. The purpose of this plate 50 is to prevent channeling of the air through the restricted space between the wall 18 and the outlet 12.

A mounting ring 52 may be provided within the upright wall of the pan 13 and this mounting ring may be provided with threaded elements 53 circumferentially spaced at intervals around the pan 13. Any suitable or convenient brackets (not shown) may be used for connecting these threaded elements 53 to suitable supports shown or adjacent the engine.

In operation, the storage reservoir 17 is filled with water through the opening normally closed by the filler cap 27. A pool of water then forms in the lower portion of the part 13 as water passes through the metering tube 22. The filter element 37 becomes thoroughly saturated over its entire surface by capillary action. The outlet 12 is connected to the carburetor air inlet. When the engine is running, air is drawn upward through the inlet 11 and into the space 54 within the outline of the filter element 37. The air then passes through the interstices of the mesh of the filter element 37. The surface area of the filter element is so large that the pressure drop from the space 54 into the chamber 23 outside the filter element is negligible.

The air is humidified in passing through the moist filter and the moist air then passes upward into the annular space 51 and out through the outlet pipe 12.

It will be observed that the direction of the current of air passing through the inlet changes abruptly so that the air may pass through the filter element 37. This change in direction is effective to cause the current of air to drop heavier particles of foreign matter, and these particles are trapped in the pool 40. The vibration and changes in attitude of the vehicle as it moves along the roadway are sufficient to cause washing action of the filter 37 by the water in the pool 40.

As the water is used up in humidifying the air additional water passes to the pool 40 through the metering tube 22. The size of the water storage chamber 17 is made large enough to furnish the water needed to drive the vehicle a distance corresponding to distances normally covered by a tank full of fuel. When a stop is made for additional fuel, the water in the storage tank 17 is replenished.

The pan 13 may be removed for inspection or cleaning of the filter when desired. The chain 47 may be readily disengaged from the slot 48 to permit the pan 13 to be lowered away from the cover 14 and filter assembly 29.

For cold weather operation I prefer to mount a ball 56 of soft rubber material or the like within the storage reservoir 17. If freezing should be encountered ice may form within the reservoir 17. The ball prevents damage to the reservoir by collapsing under the force of the freezing ice.

In the form of my invention shown in Figures 5-7, the humidifier unit 60 is substantially the same as that previously described. It may be mounted on an annular base 61 which encloses a power driven fan or blower 62. An alternating current motor 63 and a direct current motor 64 may both be connected to drive the blower 62. The direct current motor is used if the fan is to be used with a vehicle having the usual battery while the alternating current motor is used if the device is employed for a house trailer having the usual plug-in connections to domestic service lines. An air outlet to the blower 62 is provided with a screen 65.

The humidifier device 60 and support 61 may be mounted in any conventional location on the vehicle as shown in Figure 5 and are positioned within the trunk compartment. The outlet 66 is connected to a pipe 67 leading to a junction box 68. A diverter valve 69 is provided for sending the humidified air to the diffuser 70 located within the passenger compartment or to the outlet 71 of the pipe 72. The outlet 71 faces toward the rear of the vehicle and is disposed behind a flat baffle plate 73. The outlet 71 is located adjacent the air inlet 74 of the conventional air cleaner assembly 75. The baffle plate 73 prevents air from the engine fan 76 from entering with the intake of humidified air into the cleaner 75 of the outlet 71 of the pipe 72. A remote control knob 77 may be conveniently located for operation of the diverter valve 69.

Having fully described my invention, it is to be understood that I do not wish to be limited to the details herein set forth but that my invention is of the full scope of the appended claims.

I claim:

1. In a humidifier and air cleaner for the air intake of an internal combustion engine, the combination of: a cover and a pan cooperating to define an enclosure, a water reservoir formed within said enclosure, a conical filter element positioned within the enclosure and below the water reservoir, a metering tube adapted to deliver water from the reservoir to form a pool in the lower portion of the pan and to regulate the depth of the pool, the lower portion of the filter element projecting into said pool so that the filter element may be saturated by capillary action, means on the pan forming a central air inlet into the space within the filter element, whereby the air is caused to pass through the interstices of the filter element, a skirt on the cover extending into the interior of the pan adjacent the filter element, the cover having supplementary air inlet openings communicating with the space between the skirt and the pan, and means on the cover forming an outlet for delivery of moist air.

2. In a humidifier and air cleaner for the air intake of an internal combustion engine, the combination of: parts forming an enclosure, water delivery means to form a pool in the lower portion of the enclosure, a generally conical filter element within the enclosure and having its lower and larger end projecting into the pool, a skirt within the enclosure having a lower edge positioned above and adjacent said lower end of the filter, a primary air inlet for introducing air into the interior of the filter element, secondary air inlets communicating with the space between the skirt and a wall of the enclosure, and air outlet means communicating with that portion of the enclosure above the filter element whereby primary air passes through the filter element and secondary air passes closely adjacent the outer surfaces thereof.

References Cited in the file of this patent

UNITED STATES PATENTS

| | | |
|---|---|---|
| 528,882 | Keller | Nov. 6, 1894 |
| 1,274,418 | Hunt | Aug. 6, 1918 |
| 1,380,987 | Lippincott | June 7, 1921 |
| 1,784,725 | Gustafson | Dec. 9, 1930 |
| 2,170,991 | Grady | Aug. 29, 1939 |
| 2,474,746 | Lopez et al. | June 28, 1949 |
| 2,606,009 | Long | Aug. 5, 1952 |
| 2,640,689 | Schaaf | June 2, 1953 |
| 2,648,272 | Norton | Aug. 11, 1953 |
| 2,673,079 | Plunk | Mar. 23, 1954 |

FOREIGN PATENTS

| | | |
|---|---|---|
| 822,200 | France | Sept. 13, 1937 |